(12) United States Patent
Shirato et al.

(10) Patent No.: US 7,266,436 B2
(45) Date of Patent: Sep. 4, 2007

(54) LANE-KEEP CONTROL SYSTEM AND METHOD FOR VEHICLE

(75) Inventors: Ryota Shirato, Yokohama (JP); Hiroshi Mouri, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 212 days.

(21) Appl. No.: 11/110,904

(22) Filed: Apr. 21, 2005

(65) Prior Publication Data

US 2005/0240328 A1 Oct. 27, 2005

(30) Foreign Application Priority Data

Apr. 23, 2004 (JP) ............... 2004-128337

(51) Int. Cl.
*G06F 19/00* (2006.01)
(52) U.S. Cl. ............... 701/70; 701/301; 348/148
(58) Field of Classification Search .......... 701/36, 701/41, 70, 300, 301; 348/148; 340/435, 340/436, 903
See application file for complete search history.

(56) References Cited

U.S. PATENT DOCUMENTS 6,178,365 B1 1/2001 Kawagoe et al.
6,256,561 B1 7/2001 Asanuma
6,324,452 B1* 11/2001 Ikegaya ............... 701/41
6,691,008 B2* 2/2004 Kondo et al. ......... 701/41
7,117,076 B2* 10/2006 Shimakage et al. .... 701/41
2005/0096828 A1* 5/2005 Uemura et al. ........ 701/70

FOREIGN PATENT DOCUMENTS

EP 1 063 149 A2 12/2000
JP 9-207800 A 8/1997

* cited by examiner

*Primary Examiner*—Gary Chin
(74) *Attorney, Agent, or Firm*—Foley & Lardner LLP

(57) ABSTRACT

A lane-keep control system includes a traveling condition detector and a controller. The controller includes a steering intention detecting section that detects whether a driver has an intention to steer a vehicle, a first steering torque control section that controls, when the driver has no intention to steer the vehicle, a steering torque according to the traveling condition so that the vehicle keeps a predetermined position between lane markings of a lane, and a second steering torque control section that controls, when the driver has an intention to steer the vehicle, the steering torque according to the traveling condition so that a steering operation of the driver is readily reflected on steering of the vehicle. A lane-keep control method is also provided.

16 Claims, 5 Drawing Sheets

LANE-KEEP CONTROL SYSTEM AND METHOD FOR VEHICLE

BACKGROUND OF THE INVENTION

The present invention relates to a lane-keep control system and method for a vehicle.

A conventional lane-keep control system is configured to produce, based on a lane condition and a traveling condition of a vehicle, such a steering torque that forces the vehicle to follow a traveling lane and thereby guides a driver to lane-keeping, while being configured to control a deviation amount of front wheels from a guided course in accordance with a detection value of a steering torque sensor and transmitting to the driver a steering reaction force corresponding the deviation amount as disclosed in Unexamined Japanese Patent Publication No. 9-207800.

In the lane-keep control system, during the time a steering angle caused by the driver is small, the deviation amount is set smaller by using a relatively small gain. On the other hand, during the time the steering angle is relatively large, the deviation amount is set larger by using a relatively large gain. This enables the vehicle to follow the lane stably when the steering angle is small while enabling the vehicle to change the lane easily when the steering angle is large.

SUMMARY OF THE INVENTION

However, the conventional lane-keep control system has a problem as to the setting of a gain of the front wheel deviation amount responsive to a steering torque detection amount. Namely, if the gain is large in the range where the steering torque is small, a lane-keeping ability is lowered. On the contrary, if the gain is small, a vehicle behavior response with respect to a steering input by the driver is lowered.

Namely, in the above-described lane-keep control system, there is a difficulty in reconciling the incompatible characteristics, i.e., the lane-following ability and the cooperativeness with the driver.

It is accordingly an object of the present invention to provide a lane-keep control system for a vehicle, which is capable of performing a lane-keep control by consideration of the ability in lane-following and the ability in cooperation with the driver.

To achieve the above object, there is provided according to an aspect of the present invention a lane-keep control system comprising a traveling condition detector that detects a traveling condition of a vehicle, and a controller including a steering intention detecting section that detects whether a driver has an intention to steer the vehicle, a first steering torque control section that controls, when the driver has no intention to steer the vehicle, a steering torque according to the traveling condition so that the vehicle keeps a predetermined position between lane markings of a traveling lane, and a second steering torque control section that controls, when the driver has an intention to steer the vehicle, a steering torque according to the traveling condition so that a steering operation of the driver is readily reflected on steering of the vehicle.

According to another aspect of the present invention there is provided a lane-keep control method comprising detecting a traveling condition of a vehicle, detecting whether a driver has an intention to steer the vehicle, when the driver has no intention to steer the vehicle, controlling a steering torque according to the traveling condition so that the vehicle keeps a traveling lane, and when the driver has an intention to steer the vehicle, controlling the steering torque according to the traveling condition so that a steering operation of the driver is readily reflected on steering of the vehicle.

DESCRIPTION OF THE PREFERRED EMBODIMENTS

Figure 1:
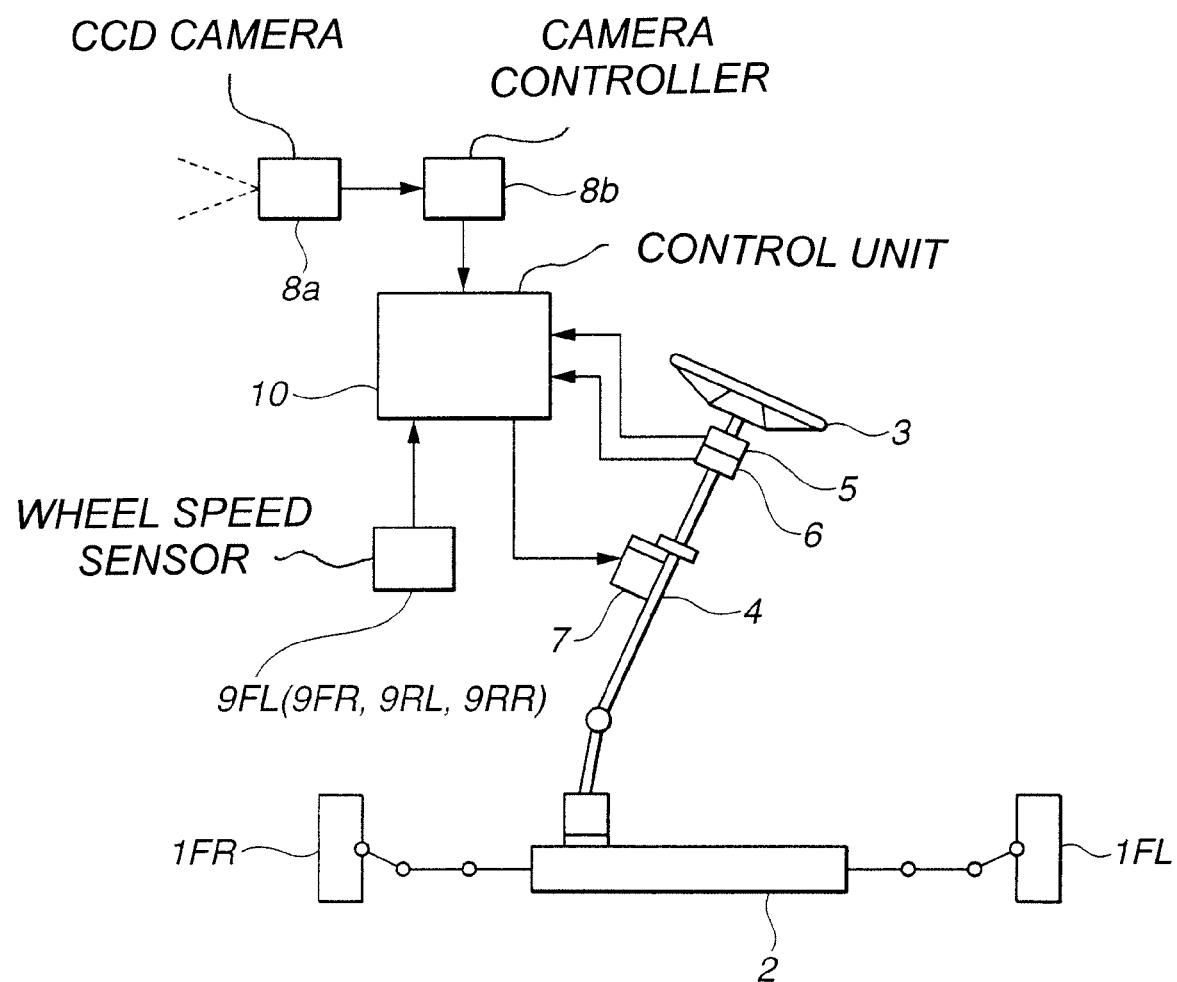
FIG. 1 is a schematic view of a lane-keep control system according to a first embodiment of the present invention.

Referring first to FIG. 1, a lane-keep control system according to a first embodiment of the present invention will be described. In the figure, 1FL indicates a front left wheel and 1FR indicates a front right wheel. A steering system is constituted by a steering gear 2 for controlling a steering angle of front left and front right wheels 1FL, 1FR, a steering wheel 3 that is operated by a driver for steering a vehicle and a steering shaft 4 mechanically connecting between steering wheel 3 and steering gear 2 for allowing rotation of steering wheel 3 to be transmitted to steering gear 2 and translated thereby as the steering angle of front left and front right wheels 1FL, 1FR that serve as dirigible wheels.

Further, the vehicle is provided with a steering torque sensor 5 that constitutes a steering torque detecting means for detecting a steering torque T based on a torsional amount of steering shaft 4 and a steering angle sensor 6 that constitutes a steering angle detecting means for detecting a steering angle θ inputted by the driver. Detection signals of sensors 5, 6 are outputted to control unit 10.

A steering actuator 7 is provided to steering shaft 4 to apply thereto a steering assist force. Steering actuator 7 is adapted to perform a steering control in accordance with a steering torque command value from control unit 10.

The vehicle is provided with a CCD camera 8a and camera controller 8b that serves as a traveling position sensor for detecting a position of an own vehicle relative to lane markings of a traveling lane ahead of the vehicle. Camera controller 8b is constructed to be capable of detecting the lane markings such as road partitioning lines from an image of road view ahead of the vehicle, which is picked up by CCD camera 8a, thereby detecting the traveling lane, while being capable of calculating a yaw angle φ of the vehicle with respect to the traveling lane, a lateral deviation X from the center of the traveling lane, the curvature of the traveling lane, etc. Signals indicative of those data are outputted to control unit 10.

Further, the vehicle is provided with wheel speed sensors 9FL, 9FR, 9RL, 9RR for detecting wheel speeds $V_{WFL}$, $V_{WFR}$ of front wheels 1FL, 1FR and wheel speeds $V_{WRL}$, $V_{WRR}$ of rear wheels (not shown), i.e., wheel speeds $V_{wi}$ (i=FL, FR, RL and RR) and wheel speeds $V_{wi}$ are also outputted to control unit 10.

Control unit 10 is configured to calculate a steering torque command value based on the detection signals inputted thereto from the above-described sensors and controller and outputs the steering torque command value to steering actuator 7 and thereby applies a steering force to the steering system.

CCD camera 8a, camera controller 8b and wheel speed sensor 9 constitute a traveling condition detecting means or detector.

Figure 2:
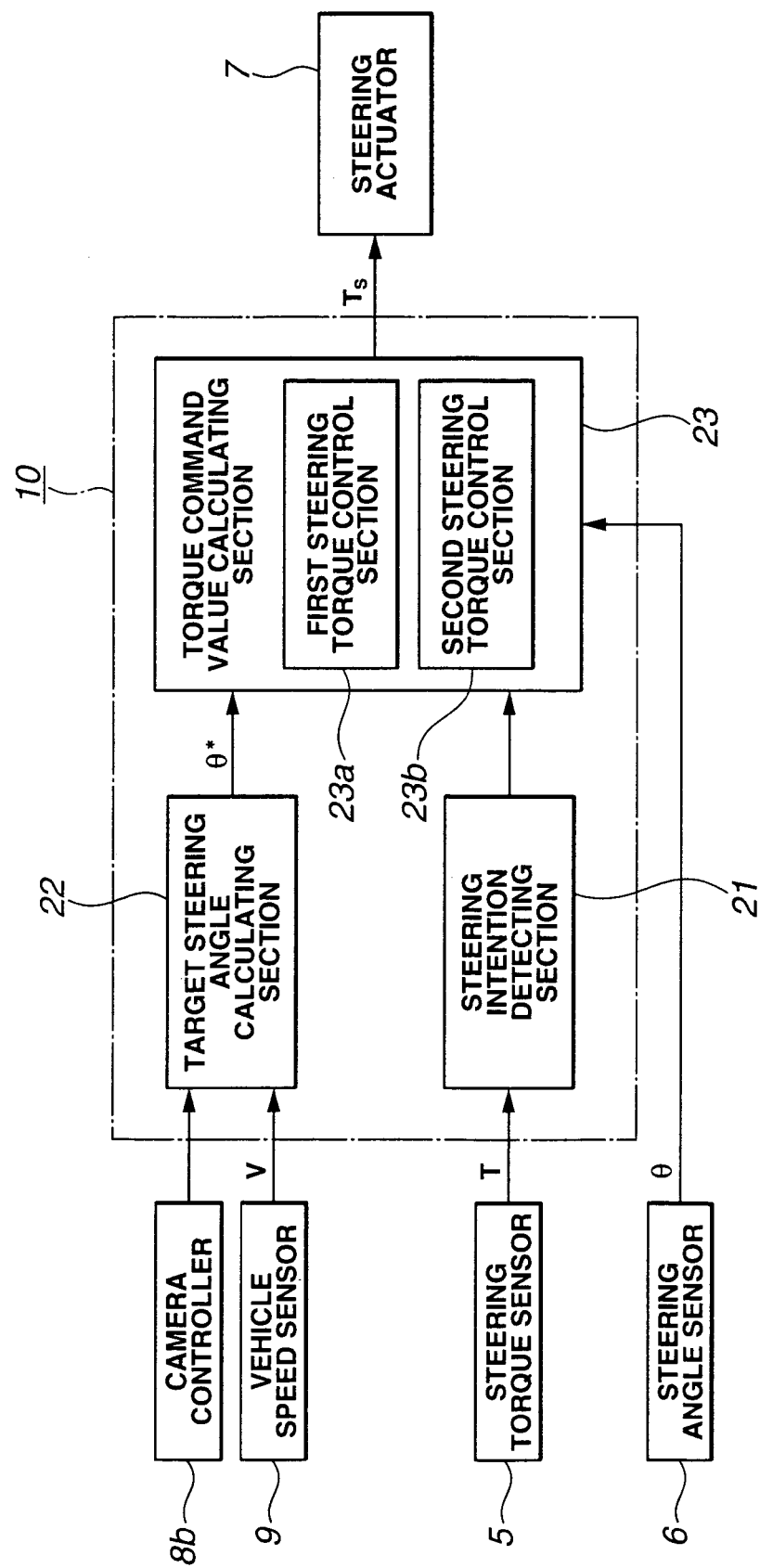
FIG. 2 is a block diagram of a control unit employed in the lane-keep control system of FIG. 1.

Control unit 10 is constituted by a control block shown in FIG. 2 and includes a steering intention detecting section 21 that detects whether a driver has an intention to steer the vehicle based on a steering torque T inputted thereto from steering torque sensor 5, a target steering angle calculating section 22 that calculates a target steering angle $\theta^*$ necessary for the vehicle to keep the center position between the lane markings of the traveling lane, and a steering torque command value calculating section 23 that calculates a steering torque command value for performing a steering torque control in accordance with the driver's intention of steering, based on the driver's intention of steering detected by steering intention detecting section 21, target steering angle $\theta^*$ calculated by target steering angle calculating section 22 and steering angle $\theta$ inputted from steering angle sensor 6.

The steering torque command value calculated by steering torque command value calculating section 23 is outputted to steering actuator 7 for thereby applying a steering force to the steering system and steering front wheels 1FL, 1FR constituting the dirigible wheels.

Further, steering torque command value calculating section 23 includes a first steering torque control section 23a for calculating a steering torque command value that causes an actual steering angle $\theta$ to coincide with target steering angle $\theta^*$ calculated by target steering angle calculating section 22 and a second steering torque control section 23b for calculating steering torque command value in accordance with a deviation $\Delta\theta(=\theta^*-\theta)$ between target steering angle $\theta^*$ calculated by target steering angle calculating section 22 and steering angle $\theta$ inputted thereto from steering angle sensor 6.

When the presence of the intention of steering (i.e., the driver has an intention to steer the vehicle) is detected by steering intention detecting section 21, steering torque command value calculated by second steering torque control section 23a is outputted to steering actuator 7. When the absence of the intention of steering (i.e., the driver has no intention to steer the vehicle) is detected, the steering torque command value calculated by first steering torque control section 23b is outputted to steering actuator 7.

Then, the lane-keep control executed by control unit 10 according to the first embodiment will be described with reference to the flowchart of FIG. 3. The lane-keep control is executed at predetermined time intervals (e.g., 10 milliseconds) by a timer interruption. First, in step S1, signals from various sensors are read.

Specifically, steering torque T is read from steering torque sensor 5, steering angle $\theta$ is read from steering angle sensor 6, wheel speeds $V_{wi}$ (i=FL, FR, RL and RR) are read from wheel speed sensors 9FL, 9FR, 9RL, 9RR, and yaw angle $\phi$ with respect to the traveling lane, lateral displacement X from the center of the traveling lane and curvature $\beta$ of the traveling lane are read from camera controller 8b.

Then, in step S2, vehicle speed V is calculated. Vehicle speed V is calculated by the following equation based on an average value of some of wheel speeds Vwi detected by wheel speed sensors 9FL, 9FR, 9RL, 9RR, for example, wheel speeds $V_{WFL}$, $V_{WFR}$ of front wheels 1FL, 1FR that are not driving wheels.

$$V=(V_{WFL}+V_{WFR})/2 \quad (1)$$

In the meantime, while it has herein been described the case where vehicle speed V is calculated based on front wheel speeds $V_{WFL}$, $V_{WFR}$, this is not for the purpose of limitation. For example, if the vehicle is equipped with an ABS control system and an anti-skid control is being executed by the ABC control system, an estimated vehicle body speed that is estimated during the anti-skid control can be used in placed of vehicle speed V calculated as described above.

Further, in case the present invention is applied to a front wheel-drive vehicle, it will do to calculate vehicle speed V of the own vehicle from wheel speeds $V_{WRL}$, $V_{WRR}$ of the rear wheels which are not driving wheels.

Then, in step S3, target steering angle $\theta^*$ is calculated. To this end, for example, a method of calculating target steering angle $\theta^*$ from target yaw rate $\gamma^*$ is used.

Figure 4:
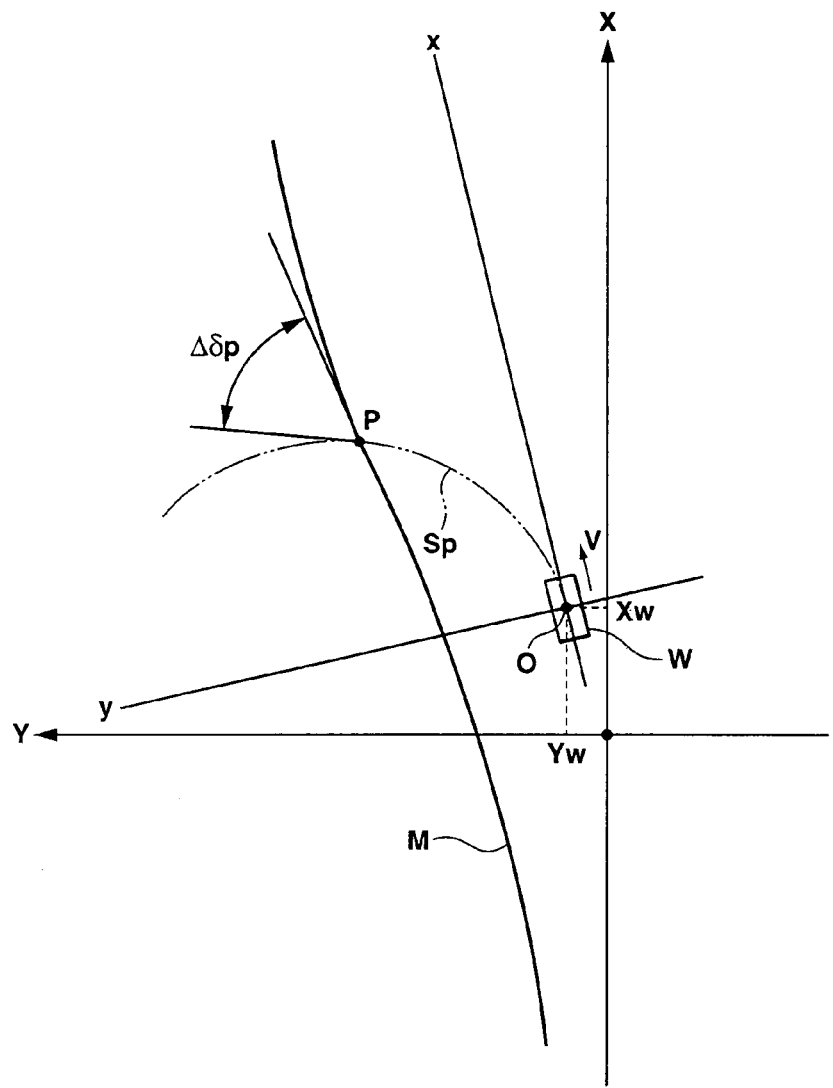
FIG. 4 is a view illustrating a target steering angle calculating process.

Specifically, as shown in FIG. 4, an x-y relative coordinates system is set in which a current position of a vehicle W is taken as the origin, the direction of movement of vehicle W is taken as the x-axis, and a direction orthogonal to the x-axis (i.e., the widthwise direction of vehicle W) is taken as the y-axis. Based on the various data read from camera controller 8b, target point P on target course M is determined. Then, calculation of target point arrival yaw rate $\gamma p$ that is caused when vehicle W travels along an imaginary course before reaching target point P, calculation of angular deviation $\Delta\delta p$ between vehicle W at the target point P and target course M, and calculation of yaw rate correction portion $\Delta\gamma p$ for eliminating the angular deviation are performed sequentially, and target yaw rate $\gamma^*$ is calculated by the following equation (2).

$$\gamma^*=\gamma p-Km\cdot\Delta\gamma p \quad (2)$$

where Km is a correction coefficient and is obtained by fuzzy estimation based on a curvature of a course along which vehicle W can travel, a road width and vehicle speed V. This is because some curvature or the like parameter of a traveling course makes it difficult for the traveling course to converge smoothly into the target course M, so that the correction coefficient Km is determined in accordance with the state variables such as curvature $\beta$ and the road width.

Target steering angle $\theta^*$ necessary for realizing target yaw rate $\gamma^*$ calculated by the equation (2) is calculated by the following equation (3).

$$\theta^*=L(1+KV^2)\cdot\gamma^*/V \quad (3)$$

where L is a wheel base of vehicle W, and K is a stability factor of steering characteristics.

In the meantime, target steering angle $\theta^*$ may be calculated from the following equation (4) by representing a correction portion for converting present yaw rate $\gamma$ to the target yaw rate $\gamma^*$ as $\Delta\gamma^*$ ($=\gamma^*-\gamma$) and a correction portion for converting the present steering angle $\theta$ to the target steering angle as $\Delta\theta^*$ ($=\theta^*-\theta$).

$$\theta^*=\theta+\Delta\theta^*=\theta+L(1+KV^2)\cdot\Delta\gamma^*/V \quad (4)$$

where present yaw rate $\gamma$ and present steering angle $\theta$ are the values obtained by using the yaw rate sensor and the steering angle sensor.

Then, in step S4, judgment on the driver's intention of steering is made. Specifically, it is determined whether steering torque T read in step S1 is larger than a steering torque threshold value $T_0$ that is set according to vehicle speed V and steering angle θ. If $T>T_0$, it is determined that the driver is intentionally supplying a steering input to the steering system, and the program proceeds to step S5. If $T \leq T_0$, it is determined that the driver is not intentionally supplying a steering input to the steering system, and the program proceeds to step S8 which will be described later.

Figure 5:
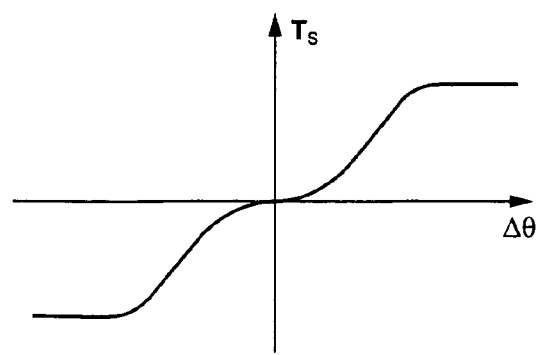
FIG. 5 is a map for calculation of a target supplemental steering torque.

In step S5, based on a steering angle deviation Δθ (=θ*−θ) between steering angle θ read in step S1 and target steering angle θ* calculated in step S3 and by reference to the target supplemental steering torque calculating map shown in FIG. 5, a target supplemental steering torque $T_s$ for transmitting an information on the central position of the traveling lane to the driver is calculated.

As shown in FIG. 5, the target supplemental steering toque calculating map is configured so that in a range where steering angle deviation Δθ is relatively small, target supplemental steering torque $T_S$ increases with increase of steering angle deviation Δθ. When steering angle deviation Δθ becomes larger than a predetermined negative value, target supplemental steering torque Ts is fixed at a constant negative value. These characteristics are tuned based on a driver's feeling and set.

A steering force generated by the target supplemental steering torque $T_S$ calculated in the manner as described above is received by the driver as a steering reaction force. This enables the driver to perform a steering operation while perceiving a deviation of the vehicle from the center position of the traveling lane. A lane-keep control mode that enables a driver's intention of steering to be easily or readily reflected on steering of the vehicle in the above-described manner is referred to as a second control mode.

Then, the program proceeds to step S6 where a count value n of a continuation time timer constituted by a software timer for measuring a continuation time of the second control mode is set at a count value $n_0$ corresponding to a predetermined continuation time $t_0$, and thereafter the program proceeds to step S7. Herein, the continuation time $t_0$ is set at a time that is sufficiently enough not to give the driver a strange feeling at the time of shifting of the control mode of lane-keep control from the second mode to a first mode which will be described later.

In step S7, after a drive signal according to the calculated supplemental torque $T_S$ is outputted to steering actuator 7, a timer interception processing is ended and the control returns to a main program.

Further, in step S8, it is determined whether the count value n is equal to or smaller than 0 (zero) If n≤0, it is determined that the continuation time for the above-described second control mode has elapsed and the program proceeds to step S9 where the target supplemental steering torque $T_S$ in the first control mode is calculated.

Specifically, in order to make the steering angle of front wheels 1FL, 1FR that constitute dirigible wheels become equal to the target steering angle θ* calculated in step S3, the difference between the target steering angle and the present steering angle is multiplied by a predetermined control gain to obtain target supplemental steering torque $T_S$ and then the control proceeds to step S7.

By the steering force produced by target supplemental steering torque $T_S$ calculated in this manner, the vehicle is controlled so as not to deviate from the traveling lane but keeps the center position of the traveling lane. The lane-keep control mode for causing the vehicle to keep the center position of the traveling lane is referred to as the first control mode.

On the other hand, if the result of judgment in step S8 is n>0, it is determined that the continuation time of the second control mode has not yet elapsed, the program proceeds to step S10 where the processing similar to step S5 is performed to obtain the target supplemental steering torque $T_S$. The target supplemental steering toque $T_S$ for performing the steering torque control that enables a steering operation of the driver to be readily or easily reflected on steering of the vehicle is thus calculated, and the second control mode is continued.

Then, the program proceeds to step S11 to decrement the count value n of the continuation timer for measuring the second control mode and thereafter proceeds to step S7.

Figure 3:
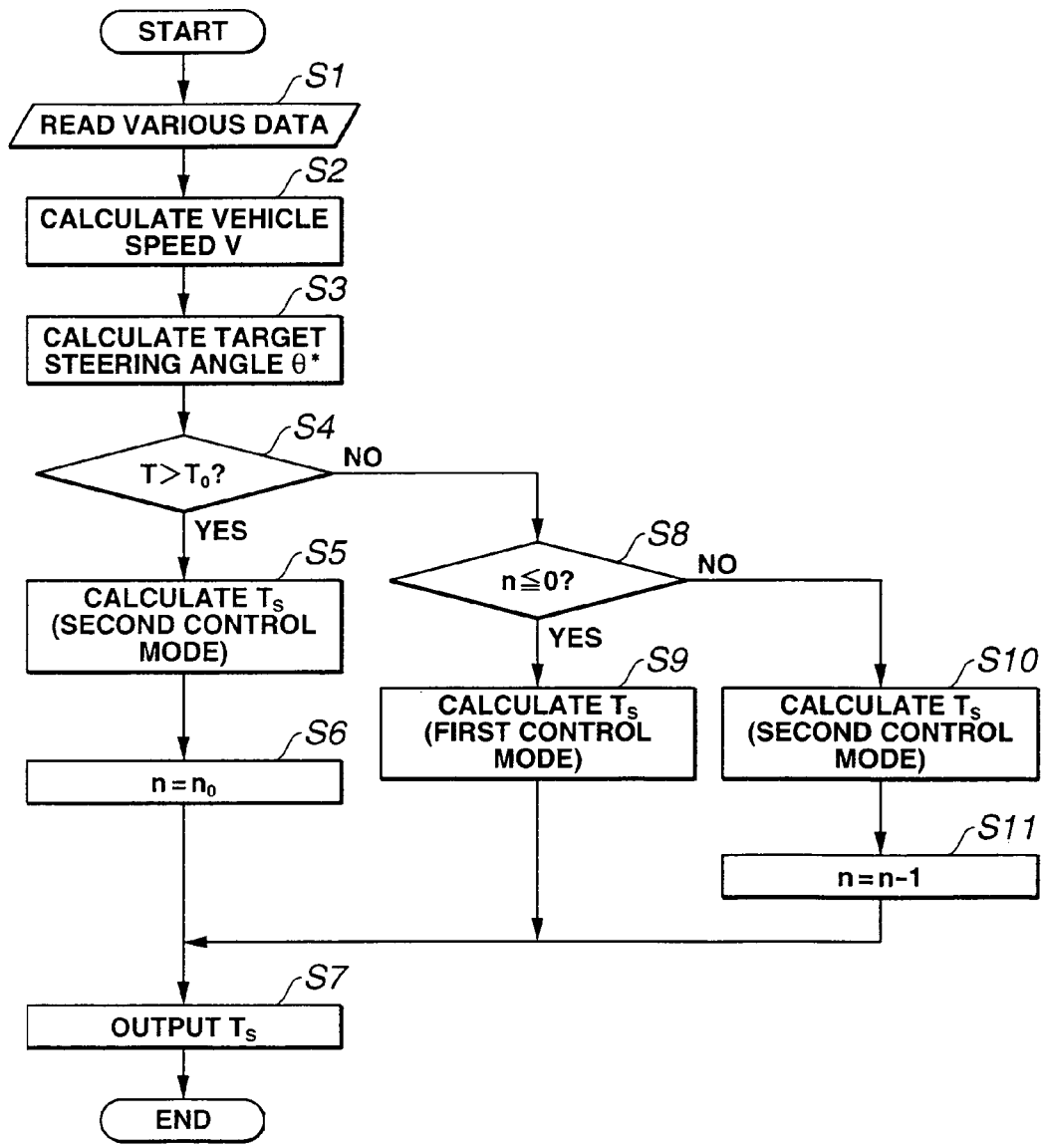
FIG. 3 is a flowchart showing a lane-keep control executed in the control unit according to the first embodiment.

In the control of FIG. 3, the processing in step S3 corresponds to a target steering angle calculating means or section, the processing in step S4 corresponds to a steering intention detecting means or section, the processing in steps S5 and S10 corresponds to a second steering torque control means or section and the processing in step S9 corresponds to a first steering torque control means or section.

It is now assumed that the vehicle is traveling straight ahead along a lane with a driver being not making a steering operation. In this instance, in the lane-keep control in FIG. 3, it is determined that the driver does not have an intention to steer the vehicle, so that the control proceeds from step S4 to step S9 through step S8. In step S9, since the vehicle is not deviated from the center position of the traveling lane and therefore it is not necessitated any steering torque to be added to the steering system for forcing the vehicle to follow the traveling lane, target supplemental steering torque TS is calculated to be 0 (zero). By this, the straight-ahead running according to the steering operation of the driver is continued.

It is then assumed that from the above-described situation the vehicle starts deviating gradually from the center position of the traveling lane to the left side due to inattentive driving. In this instance, first in step S3 target steering angle θ* necessary for positioning the vehicle at the center of the lane is calculated based on the lane condition ahead of the vehicle and the vehicle traveling condition. If the driver is not performing a steering operation, the control proceeds from step S4 to step S8 through step S9 to calculate the target supplemental steering torque $T_S$ for making the steering angle of front wheels 1FL, 1FR that constitute dirigible wheels become equal to target steering angle θ*. By outputting a drive signal according to target steering torque $T_S$ to steering actuator 7, a steering torque control by the first control mode is executed and correction of the traveling course to the right side, i.e., in the direction to avoid the deviation is performed assuredly.

In this manner, in case the vehicle is tending to deviate from the traveling lane, it is executed a steering torque control for causing the target steering angle calculated based on the traveling lane condition and the running condition of the vehicle and the actual steering angle of the dirigible wheels to coincide with each other, thus making it possible to prevent deviation of the vehicle from the traveling lane assuredly.

On the other hand, it is assumed that the vehicle is traveling along a lane of a curved road. In this instance, since turning of the vehicle is performed by the driver and therefore it is determined that the steering operation is performed intentionally by the driver, the control proceeds from step S4 to step S5. In this instance, since target steering angle θ* and actual steering angle θ caused by a steering operation of the driver coincide with each other, steering angle deviation Δθ becomes zero (i.e., Δθ=0) and target supplemental steering torque $T_S$ is calculated to be zero (i.e., $T_S=0$). By this, traveling of the vehicle according to a steering operation of the driver is continued.

Further, in case the driver intentionally intervenes in the steering operation for causing the vehicle to change lanes, steering torque T larger than steering torque threshold value $T_0$ is detected and it is determined that the driver is intentionally performing a steering operation. Thus, the control proceeds from step S4 to step S5 to calculate target supplemental steering torque $T_S$ according to steering angle deviation $\Delta\theta$ between target steering angle $\theta^*$ and steering angle $\theta$ caused by the steering operation of the driver, based on the map of FIG. 5. By outputting a drive signal according to target supplemental steering torque $T_S$ to steering actuator 7, the second mode of steering torque control is executed so that the driver receives a steering reaction force corresponding to steering angle deviation $\Delta\theta$.

In this instance, the driver receives a larger reaction force as steering angle $\theta$ caused by the steering operation of the driver becomes larger. However, since the increase rate of the steering reaction force decreases with increase of steering angle $\theta$, the steering reaction force is maintained constant after steering angle deviation $\Delta\theta$ becomes larger than a predetermined value. When the driver is making such a large steering effort that causes steering angle deviation $\theta^*$ to become larger than a predetermined value, it can be determined that deviation from the traveling lane is apparently caused by the intention of the driver. Thus, in such a case, the steering reaction force is controlled so as not to become larger than a predetermined value for making the steering operation of the driver be readily or easily reflected on steering of the vehicle. This enables the driver to perform a steering operation without having any strange feeling.

Further, it is considered that the steering operation at the time of turning of the vehicle around a corner or curve may cause a deviation between target steering angle $\theta^*$ and steering angle $\theta$ caused by a steering operation of the driver though the driver does not have an intention to deviate the vehicle from the traveling lane. Thus, in case steering angle deviation $\theta^*$ is relatively small, calculation is made so that a large increase in target supplemental steering torque $T_S$ is obtained even for a small increase in the steering angle deviation $\Delta\theta$ for enabling the driver to receive the steering reaction force sensitively. This enables the vehicle to follow the traveling lane more stably.

The driver can receive a steering reaction force corresponding to the amount of deviation from the center of the traveling lane, the driver. Thus, in case deviation of the vehicle from the traveling lane is due to the intention of the driver, the driver can deviate the vehicle from the traveling lane for lane change or the like while perceiving the direction of deviation and the amount of deviation. Namely, the driver can perceive, from the direction of the steering torque added to the steering system as a steering reaction force, the direction of deviation from the center of the traveling lane and perceiving, from the magnitude of the steering torque, the amount of deviation of the vehicle from the center of the traveling lane.

In case the driver finishes a steering operation under the condition where the second mode of steering torque control is executed, the control proceeds from step S4 to step S8 and then from step S8 to step S10, since the continuation time $t_0$ of the second mode of steering torque control has not yet elapsed and the continuation time timer n is larger than 0 (zero) (i.e., n>0, to continue the second mode of steering torque control. In this instance, if the vehicle is deviating from the traveling lane, correction of the traveling course in the direction to avoid deviation is made by applying to the steering system target supplemental steering torque $T_S$ as a steering reaction force corresponding to target steering angle $\theta^*$.

Thereafter, since the count value n of the continuation time timer becomes zero (i.e., n=0) when the continuation time $t_0$ has elapsed, the control proceeds to step S9 as the result of determination in step S8 so that the control mode shifts to the first control mode. In this instance, when the vehicle is deviating from the lane, correction of the traveling course for assuredly avoiding the deviation is made by target supplemental steering torque $T_S$ that causes target steering angle $\theta^*$ and steering angle $\theta$ of the dirigible wheels to coincide with each other.

In this manner, when it is determined that the driver has an intention to steer the vehicle, the control mode is shifted rapidly from the first mode to the second mode, thus making it possible to reflect the steering operation of the driver and attain a travel control that does not give the diver a strange feeling.

Further, if the steering operation of the driver is finished when the second mode of steering torque control is being executed due to the determination that the driver has an intention to steer the vehicle, the control mode is shifted from the second control mode to the first control mode after lapse of a predetermined time, thus making it possible to prevent the steering force caused in the vehicle from being varied rapidly or suddenly and thereby attain a travel control that does not give the driver a strange feeling.

In this manner, in the above-described first embodiment, the driver's intention of steering is detected and the control mode of lane-keep control is shifted based on the driver's intention of steering. Namely, when it is determined that the driver have no intention to steer the vehicle, a travel control that attaches much importance to the lane followability is performed. When it is determined that the driver has an intention to steer the vehicle, a travel control that attaches much importance to the steering operation of the driver is performed. This makes it possible to attain a travel control that can realize stable lane-following of the vehicle and that does not give the driver a strange feeling.

Further, since it is determined that the driver has an intention to steer the vehicle when the steering torque that is detected based on the twisting or torsion of the steering shaft exceeds a steering torque threshold value that is determined based on the vehicle speed and the steering angle caused by the steering operation of the driver, it becomes possible to detect the driver's intention of steering assuredly and realize a lane followability that is hard to be influenced by the external disturbances such as a lateral slope of a road surface and a lateral wind.

Further, when it is determined that the driver have no intention to steer the vehicle, it is produced a target supplemental steering torque that causes the actual steering angle of the dirigible wheels to coincide with a target steering angle that is calculated based on the lane condition ahead of the vehicle and the vehicle traveling condition, thus making it possible to realize a sufficient lane followability and attain stable traveling of the vehicle.

Further, when it is determined that the driver has an intention to steer the vehicle, a target supplemental steering torque is produced according to the deviation between a target steering angle calculated based on the lane condition ahead of the vehicle and the vehicle traveling condition and a steering angle caused by a steering operation of the vehicle, thus making it possible to perform a travel control that reflects a steering operation of the driver and that does not give a strange feeling to the driver.

Namely, when the steering angle deviation is small, a large increase in the target supplemental steering torque is caused by a small increase in the steering angle deviation, thereby enabling the driver to receive a steering reaction force sensitively. Thus, when the driver has an intention to steer the vehicle, it becomes possible to transmit an information about the center position of the traveling lane to the driver. On the other hand, when the driver does not have an intention to steer the vehicle, it becomes possible to correct, by a steering torque applied to the steering system as a steering reaction force, the traveling course of the vehicle so as to prevent the vehicle from deviating from the lane.

Further, when the steering angle deviation is large, it is determined that deviation of the vehicle from the traveling lane is apparently due to the intention of the driver, and a control is made so that a target supplemental steering torque larger than a predetermined value is not produced. This makes it possible to suitably reflect the steering operation of the driver in a vehicle steering control, and a travel control that does not give the driver a strange feeling can be performed.

Further, if the steering operation of the driver is finished when a steering torque control is being executed by a control mode that attaches much importance to the steering operation of the driver due to the determination that the driver has an intention to steer the vehicle, a control mode is shifted to such one that attaches much importance to the lane followability after lapse of a predetermined time. This makes it possible to prevent the steering force of the vehicle from changing sharply or suddenly and attain a travel control that does not give the driver a strange feeling.

The second embodiment will be described.

In the first embodiment, when it is determined that the driver have no intention to steer the vehicle, the control mode is shifted to the first control mode after lapse of a predetermined time. In contrast to this, in the second embodiment, the control mode is shifted to the first control mode gradually within a predetermined time.

Figure 6:
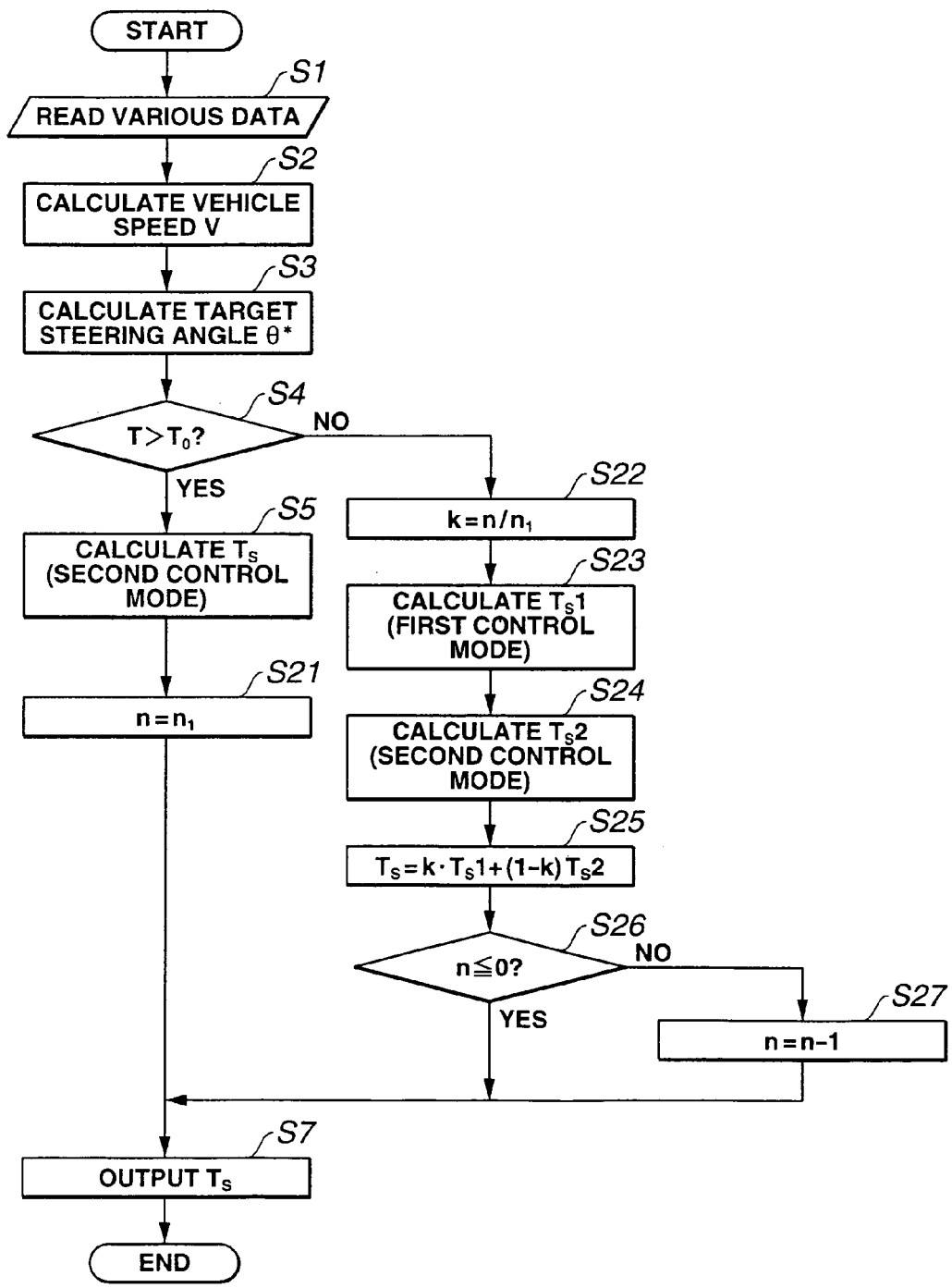
FIG. 6 is a flowchart showing a lane-keep control executed in the control unit according to a second embodiment.

Namely, the lane-keep control process executed in control unit 10 according to the second embodiment is substantially similar to that of FIG. 3 except that step S6 in FIG. 3 of the first embodiment is replaced by step S21 in which the count value n for determining the control distribution ratio is set at a predetermined value n1 and steps S8 to S11 are replaced by step S22 for calculating the control distribution ratio k, step S23 for calculating a target supplemental steering torque $T_S1$ in the first control mode, step S24 for calculating a target supplemental steering torque $T_S2$ in the second control mode, step S25 for calculating the target supplemental steering torque $T_S$ according to the control distribution ratio k, step S26 for determining whether the count value n is equal to or smaller than zero (0), and step S27 for decrementing the count value n if the result of determination in step S26 is NO (negative), respectively. Thus, in FIG. 6, like or corresponding portions to those in FIG. 3 are designated by like reference characters and repeated description thereto is omitted for brevity.

First, in the above-described step S5, target supplemental steering torque $T_S$ is calculated based on the target supplemental steering torque calculating map of FIG. 5. Then, the program proceeds to step S21 where the count value n for calculating control distribution ratio k between the steering torque in the first control mode and the steering torque in the second control mode is set at a count value n1 corresponding to a previously set transition time t1, and thereafter the program proceeds to step S7. Herein, an initial value of the count value n for determining the control distribution ratio k is zero (0).

In this instance, the transition time t1 is set at a sufficient time so as not to give the driver a strange feeling at the time of transition from the second control mode to the first mode.

Further, if it is determined in step S4 that the driver has no intention to steer the vehicle, the program proceeds to step S22 where the control distribution ratio k is calculated by the equation (5).

$$K = n/n1 \tag{5}$$

Then, in step S23, similarly to step S9 of FIG. 3 in the first embodiment, a target supplemental steering torque for causing the steering angle of the dirigible wheels to coincide with target steering angle θ* is calculated and represented as $T_S1$. Then, the program proceeds to step S24.

In step S24, similarly to steps S5 and S10 of FIG. 3 in the first embodiment, a target supplemental steering torque according to the deviation Δθ between target steering angle θ* and steering angle θ caused by a steering operation of the driver is calculated and represented as $T_S2$, and then the program proceeds to step S25.

In step S25, a final, target supplemental steering torque $T_S$ is calculated by distributing the target supplemental steering torques in the first and second control modes, which are respectively calculated in steps S23 and S24, according to the control distribution ratio k calculated in step S22.

$$T_S = k \times T_S1 + (1-k) \times T^S2 \tag{6}$$

Then, the program proceeds to step S26 where it is determined whether the count value n is equal to or lower than zero (0). If n>0, the program proceeds to step S27 to decrement the count value n and then to step S7. If n≦0, the program proceeds directly to step S7.

It is now assumed that the vehicle is gradually deviating from the center position of the traveling lane to the left due to inattentive driving. When this is the case, it is first calculated in step S3 target steering angle θ* necessary for positioning the vehicle at the center of the traveling lane based on the lane condition ahead of the vehicle and the vehicle traveling condition. Since the driver is not performing a steering operation, the program proceeds from step S4 to step S22. Since the initial count value n for determining control distribution ratio k is set at zero (0), control distribution ratio k is calculated in step S22 to zero (0) (i.e., k=0). For this reason, the distribution ratio for the steering torque control by the second control mode becomes zero, target supplemental steering torque $T_S1$ for causing the actual steering angle of the dirigible wheels, i.e., front wheels 1FL, 1FR to coincide with target steering angle θ* is calculated as target supplemental steering torque $T_S$. A drive signal representative of target supplemental steering torque $T_S$ is outputted to the steering actuator. By this, the first mode of steering torque control is executed and correction of the traveling course to the right which is the direction to prevent the vehicle from; deviating from the traveling lane is performed adequately.

It is assumed that from the above condition, the driver intentionally performs a steering-interruption to make a lane-change of the vehicle. When this is the case, the steering torque T exceeding the steering torque threshold value $T_0$ is detected, and the program proceeds from step S4 to step S5 where the target supplemental steering torque $T_S$ according to deviation Δθ between target steering angle θ* and actual steering angle θ caused by the steering operation of the driver is calculated based on the map of FIG. 5. After count value n for determining control distribution ration k is set at a predetermined count value n1, a drive signal representative of the target supplemental steering torque $T_S$ is outputted to the steering actuator. By this, the second mode of steering torque control is executed such that the driver receives a steering reaction force corresponding to steering angle deviation $\Delta\theta$ and thereby makes a lane-change while perceiving the center position of the traveling lane.

Thereafter, when the driver finishes a steering operation, the program proceeds from step S4 to step S22. In step S22, since count value n for determining control distribution ratio k has been set to n1 (i.e., n=n1), control distribution ratio k is calculated to 1 (i.e., k=1). For this reason, the distribution ratio for the first mode of steering torque control becomes 0 (zero). Thus, in step S25, target supplemental steering torque $T_S2$ for providing the driver with a steering reaction force according to steering angle deviation $\Delta\theta$ is calculated as target supplemental steering torque $T_S$. After count value n is decremented in step S27, a drive signal representative of target supplemental steering torque $T_S$ is outputted to steering actuator 7 and the second mode of steering torque control is continued.

It is assumed that it still continues a condition in which the driver does not perform a steering operation and it has not yet elapsed the time t1 for the lane-keep control mode to shift, control distribution ratio k is calculated in step S22 on the basis of count value n having been set so that n<n1, so that k<1. For this reason, distribution of supplemental steering torque to target supplemental steering torque $T_S1$ in the first mode of steering torque control and target supplemental steering torque $T_S2$ in the second mode of steering torque control is performed according to control distribution ratio k and the final target supplemental steering torque $T_S$ is calculated based on the equation (6).

By this, in addition to the second steering torque control mode, the first steering torque control mode is executed. At this time, distribution of torque to the respective control modes is determined according to control distribution ratio k that is calculated by the equation (5). Thus, in case of shifting from the second control mode to the first control mode, the steering torque allotted to the first control mode increases gradually with lapse of time before transition time t1 elapses.

When transition time t1 has elapsed, count value n is set at 0 (zero) and control distribution ratio k is calculated to be 0 (zero). Thus, the target supplemental steering torque $T_S1$ for causing the steer angle of the dirigible wheels, i.e., front wheels 1FL, 1FR to coincide with the target steering angle is calculated as target supplemental steering torque $T_S$. A drive signal representative of target supplemental steering torque $T_s$ is outputted to the steering actuator, and only the first steering torque control mode is executed.

In this manner, in the second embodiment, in case of transition from a condition in which the driver has an intention to steer the vehicle to a condition in which the driver has no intention to steer the vehicle, thus causing the lane-keep control mode to shift from the second control mode to the first control mode, the control distribution ratio is set so that shifting to the first control mode is carried out gradually, thus making it possible to attain such a travel control that does not give the driver a strange feeling with respect to a variation in supplemental steering torque applied to the steering system.

Further, in case of shifting from the condition in which the driver has no intention to steer the vehicle to the condition in which the driver has an intention to steer the vehicle, the mode of lane-keep control shifts immediately from the first control mode to the second control mode, thus making it possible to perform a travel control without preventing a steering interruption by the driver and without giving the driver any strange feeling.

The entire contents of Japanese Patent Application P2004-128337 (filed Apr. 23, 2004) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while the embodiments have been described with respect to the case where steering torque threshold value $T_0$ for determining the driver's intention of steering is set in accordance with the vehicle speed and the steering angle, this is not for the purpose of limitation. For example, steering torque threshold value $T_0$ may be set in accordance with the radius of curvature of the traveling road and the kind of road that are obtained from a navigation system. The scope of the invention is defined with reference to the following claims.

What is claimed is:

1. A lane-keep control system comprising:
    a traveling condition detector that detects a traveling condition of a vehicle; and
    a controller including:
        a steering intention detecting section configured to detect whether a driver has an intention to steer the vehicle;
        a first steering torque control section configured to control, when the driver has no intention to steer the vehicle, a steering torque according to the traveling condition so that the vehicle keeps a predetermined position between lane markings of a traveling lane; and
        a second steering torque control section configured to control, when the driver has an intention to steer the vehicle, a steering torque according to the traveling condition so that a steering operation of the driver is readily reflected in steering of the vehicle;
    further comprising a steering angle sensor configured to detect an actual steering angle, wherein the controller further includes a target steering angle calculating section that calculates a target steering angle necessary for the vehicle to keep the predetermined position between the lane markings, wherein the first steering torque control section is configured to control the steering torque such that the actual steering angle coincides with the target steering angle, and the second steering torque control section is configured to control the steering torque according to a steering angle deviation, wherein the steering angle deviation is a difference between the target steering angle and the actual steering angle;
    wherein the second steering torque control section is configured to control a steering torque control amount for increasing the steering torque such that the steering torque control amount increases with an increase of the steering angle deviation, wherein a rate of increase of the steering torque control amount decreases with an increase of the steering angle deviation.

2. A lane-keep control system according to claim 1, further comprising a steering torque sensor configured to detect the steering torque, wherein the steering intention detecting section is configured to determine that the driver has an intention to steer the vehicle when the steering torque is larger than a predetermined value.

3. A lane-keep control system according to claim 1, wherein the steering torque control amount is a target supplemental steering torque, and wherein the second steering torque control section is configured to calculate the target supplemental steering torque according to the steering angle deviation.

4. A lane-keep control system according to claim 1, wherein the traveling condition detector is configured to detect a traveling lane condition and a position of the vehicle with respect to the lane markings and a vehicle speed, wherein the target steering angle calculating section is configured to calculate a target yaw rate based on the traveling condition and calculates the target steering angle that realizes the target yaw rate.

5. A lane-keep control system according to claim 1, wherein the controller further comprises a control section configured to cause, when a change of detection of an intention of the driver to steer the vehicle from the presence of detection of the intention to the absence of detection of the intention occurs, a steering torque control mode to shift from a control mode by the second steering torque control section to a control mode by the first steering torque control section after a lapse of a predetermined time.

6. A lane-keep control system according to claim 1, wherein the controller further comprises a control section configured to cause, when a change of detection of an intention of the driver to steer the vehicle from the presence of detection of the intention to the absence of detection of the intention occurs, a steering torque control mode to shift from a control mode by the second steering torque control section to a control mode by the first steering torque control section gradually within a predetermined time.

7. A lane-keep control system according to claim 6, wherein the first steering torque control section and the second steering torque control section are configured to calculate respective target supplemental steering torques according to a control distribution ratio that causes the target supplemental steering torque calculated by the first steering torque control section to increase with a lapse of time.

8. A lane-keep control system according to claim 1, wherein the controller further comprises a control section that causes, when a change of detection of an intention of the driver to steer the vehicle from the absence of detection of the intention to the presence of detection of the intention occurs, a steering torque control mode to shift from a control mode by the first steering torque control section to a control mode by the second steering torque control section immediately.

9. A lane-keep control system comprising:
a traveling condition detecting means for detecting a traveling condition of a vehicle;
a steering intention detecting means for detecting whether a driver has an intention to steer the vehicle;
a first steering torque control means for controlling, when the driver has no intention to steer the vehicle, a steering torque according to the traveling condition so that the vehicle keeps a predetermined position between lane markings of a traveling lane;
a second steering torque control means for controlling, when the driver has an intention to steer the vehicle, a steering torque according to the traveling condition so that a steering operation of the driver is readily reflected in steering of the vehicle; and
a steering angle sensing means for detecting an actual steering angle, wherein the system further includes a target steering angle calculating section that calculates a target steering angle necessary for the vehicle to keep the predetermined position between the lane markings, wherein the first steering torque control means is configured to control the steering torque such that the actual steering angle coincides with the target steering angle, and the second steering torque control means is configured to control the steering torque according to a steering angle deviation, wherein the steering angle deviation is a difference between the target steering angle and the actual steering angle;
wherein the second steering torque control means is configured to control a steering torque control amount for increasing the steering torque such that the steering torque control amount increases with increase of the steering angle deviation, wherein a rate of increase of the steering torque control amount decreases with an increase of the steering angle deviation.

10. A lane-keep control method comprising:
detecting a traveling condition of a vehicle;
detecting whether a driver has an intention to steer the vehicle;
when the driver has no intention to steer the vehicle, controlling a steering torque according to the traveling condition so that the vehicle keeps a predetermined position between lane markings of a traveling lane;
when the driver has an intention to steer the vehicle, controlling the steering torque according to the traveling condition so that a steering operation of the driver is readily reflected in steering of the vehicle; and
detecting an actual steering angle, calculating a target steering angle necessary for the vehicle to keep the predetermined position between the lane markings of the traveling lane, wherein the controlling of the steering torque when the driver has no intention to steer the vehicle includes controlling the steering torque so that the actual steering angle coincides with the target steering angle, wherein the controlling of the steering torque when the driver has an intention to steer the vehicle includes controlling the steering torque according to a steering angle deviation that is a difference between the target steering angle and the actual steering angle;
wherein the controlling of the steering torque when the driver has an intention to steer the vehicle comprises controlling a steering torque control amount for increasing the steering torque, wherein the steering torque control amount increases with an increase of the steering angle deviation and a rate of increase of the steering torque control amount decreases with an increase of the steering angle deviation.

11. A lane-keep control method according to claim 10, further comprising detecting the steering torque, wherein the detecting whether the driver has an intention to steer the vehicle includes determining that the driver has an intention to steer the vehicle when the steering torque is larger than a predetermined value.

12. A lane-keep control method according to claim 10, wherein the steering torque control amount is a target supplemental steering torque, and wherein the controlling the steering torque control amount comprises calculating the target supplemental steering torque according to the steering angle deviation.

13. A lane-keep control method according to claim 10, wherein the detecting the traveling condition includes detecting a traveling lane condition, a position of the vehicle with respect to the lane markings and a vehicle speed, and wherein the calculating the target steering angle includes calculating a target yaw rate based on the traveling condition and calculating the target steering angle that realizes the target yaw rate.

14. A lane-keep control method according to claim 10, further comprising, when a change of detection of an intention of the driver to steer the vehicle changes from the presence of detection of the intention to the absence of detection of the intention occurs, shifting a steering torque control mode from a control mode in which the steering torque is controlled according to the traveling condition so that the vehicle keeps the predetermined position between lane markings of the traveling lane to a control mode in which the steering torque is controlled according to the traveling condition so that the steering operation of the driver is readily reflected in steering of the vehicle, wherein the shifting occurs after a lapse of a predetermined time.

15. A lane-keep control method according to claim 10, further comprising, when a change of detection of an intention of the driver to steer the vehicle from the presence of detection of the intention to the absence of detection of the intention occurs, shifting a steering torque control mode from a control mode in which the steering torque is controlled according to the traveling condition so that the vehicle keeps the predetermined position between lane markings of the traveling lane to a control mode in which the steering torque is controlled according to the traveling condition so that the steering operation of the driver is readily reflected in steering of the vehicle, wherein the shifting occurs, wherein the shifting occurs gradually within a predetermined time.

16. A lane-keep control method according to claim 10, further comprising, when a change of detection of an intention of the driver to steer the vehicle from the absence of detection of the intention to the presence of detection of the intention occurs, shifting a steering torque control mode from a control mode in which the steering torque is controlled according to the traveling condition so that the vehicle keeps the predetermined position between lane markings of the traveling lane to a control mode in which the steering torque is controlled according to the traveling condition so that the steering operation of the driver is readily reflected in steering of the vehicle, wherein the shifting occurs immediately.

* * * * *